United States Patent [19]

Pei

[11] 4,033,327

[45] July 5, 1977

[54] SOLAR ENERGY COLLECTOR MODULE SYSTEM

[75] Inventor: Yu K. Pei, Toledo, Ohio

[73] Assignee: Owens-Illinois, Inc., Toledo, Ohio

[22] Filed: Nov. 24, 1975

[21] Appl. No.: 634,714

[52] U.S. Cl. .................................. 126/271; 165/142
[51] Int. Cl.² ............................................ F24J 3/02
[58] Field of Search ............ 126/270, 271; 165/142

[56] References Cited

UNITED STATES PATENTS

| 980,505 | 1/1911 | Emmet | 126/271 |
| 3,227,153 | 1/1966 | Godel et al. | 126/271 |
| 3,960,136 | 6/1976 | Moan et al. | 126/270 |

Primary Examiner—Carroll B. Dority, Jr.
Attorney, Agent, or Firm—J. R. Nelson

[57] ABSTRACT

The invention disclosed is a solar energy collector apparatus having several double-wall glass tubular elements connected on opposite sides of an elongated manifold to form a module. The elements are sealed in oppositely facing metal cups and inside the opposite elements is a cross supply tube. The cups in a module are series connected by conduits for flow of a liquid through the collectors. Along the manifold are two header pipes respectively connected to the cups for introducing liquid to the collectors for series flow and for receiving heated liquid flowed through them. The headers also connect a series of modules and the system utilizing the solar heated liquid. The cups, header pipes and interconnecting conduits are enclosed in an insulation jacket of foamed plastic, e.g. polyurethane. The manifold includes support brackets for mounting the apparatus in spaced drainage position above a supporting surface having a solar exposure. The outer ends of the tubular collectors are supported on an end loading device which firmly supports the element above the support surface and retains the element in its manifold cup when under hydraulic pressure.

22 Claims, 15 Drawing Figures

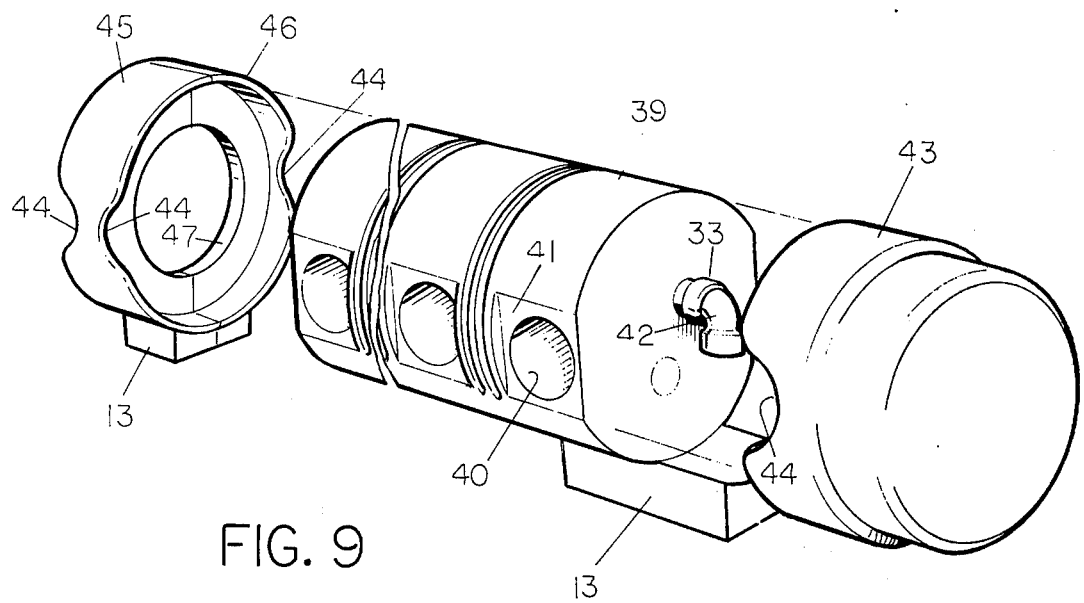

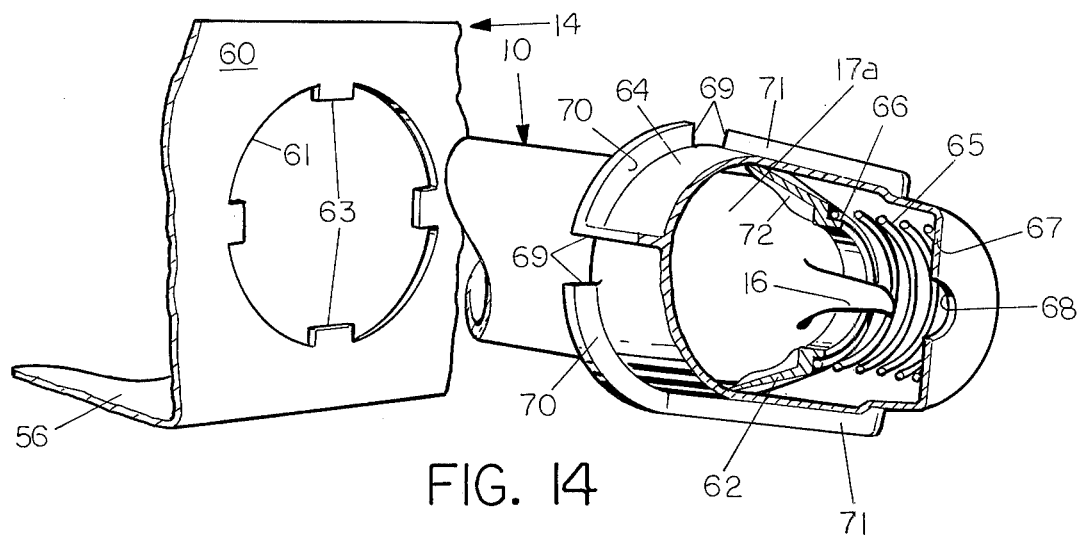
FIG. 14
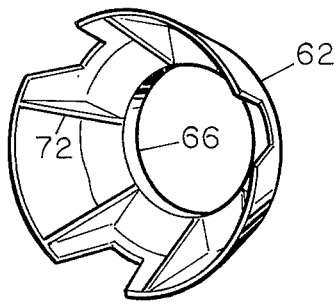
FIG. 13
FIG. 15
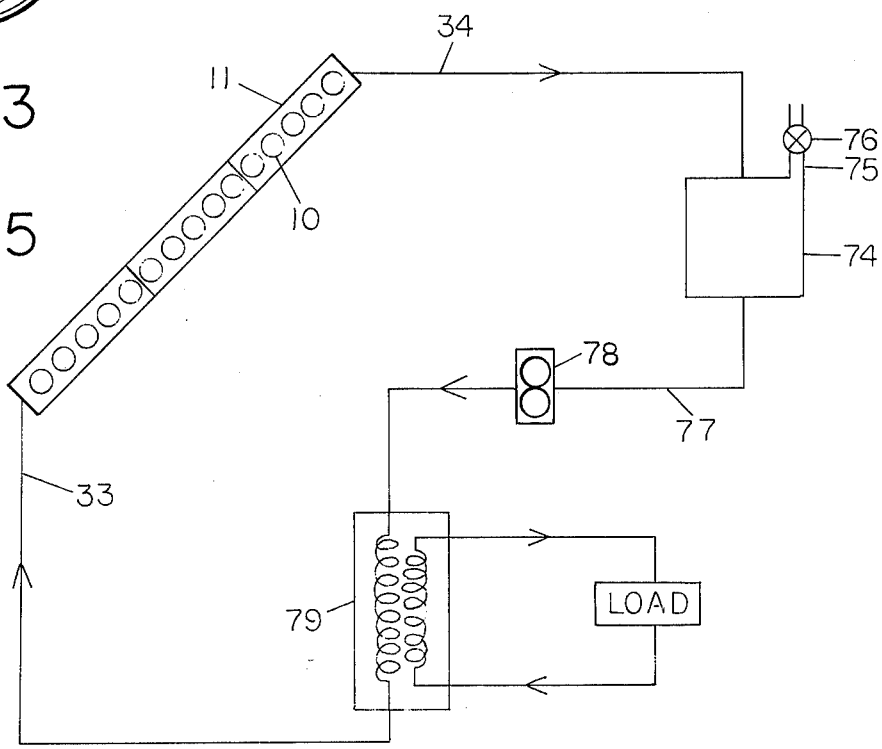

SOLAR ENERGY COLLECTOR MODULE SYSTEM

The present invention relates to the collection of solar energy radiated by the sun's rays in a solar collector apparatus; and more particularly, the invention pertains to the construction and operation of an improved solar energy collector apparatus.

The solar energy collector is comprised of a series of tubular glass collector assemblies arranged with respect to a manifold, which is constructed and arranged as a solar collector module. The solar collector module consists of several collector tube assemblies, for example 24, manifolded together. The assemblies are mounted at their outboard ends in a supporting bracket and at their inboard ends in a manifold connection. The end mountings are designed so that the lateral spacings between tubes is approximately one diameter apart and the spacing from the background reflector surface, such as a diffuse reflector surface on the roof or curtain wall, in a direction toward the sun exposure is on the order of 2 to 4 tube diameters.

On the side of the tubes away from the sun there is a diffuse-reflector surface to reflect the rays of the sun which pass between the absorber tubes back toward the tubes. This reflector surface is coextensive with the area of the array of tubular assemblies.

The collector assemblies utilize three glass tubes concentrically arranged. An outer cover tube envelopes an inner absorber tube which is precoated on its outside surface with a wave length selective coating having properties of high absorption and low emission (re-radiation). Preferably, the selective coating is one having more than 0.8 absorption in wave lengths above 2.5 microns and less than 0.1 emission in the infra-red wave lengths (less than 2.5 microns). The one end of the cover tube wall is sealed to the absorber tube wall near one end of the absorber by a glass-to-glass hermetic seal and the space between the two is evacuated through a tubulation at the other end of the cover tube to a pressure less than $10^{-4}$ torr and baked at high temperature for the removal of moisture. The tubulation at the end of the cover tube is tipped off in the known manner so as to form a vacuum tight, long life seal. The collector assemblies are manufactured from readily available, commercial sizes of drawn glass tubing of glass composition having transparency and high purity (low iron content), one example being a borosilicate glass composition.

This invention simplifies the procecure of installation of the solar energy collector by incorporating all components of a manifold in pre-assembled units, thus reducing cost of assembly and installation at the location.

The manifold for the modules is manufactured from stampings of metal, such as copper, shaped into cups and connected with liquid cross-over tubes that arrange the outwardly facing collector cups for receiving the collectors in a series along the length of the manifold and on either side thereof. Internal headers for handling the inflow and outflow of liquid to the manifold cups are constructed of standard size metal tubing such as copper. The headers form the means of connecting modules together at the manifold in a larger system construction and/or for connecting the module or modules into the system for utilization flow of the liquid that is to be heated by the absorbed solar energy.

In this invention, headers are incorporated as part of the manifold. The headers run along the whole length of the manifold and are connected to the inlet and outlet of the manifold. The headers are encased in the rigid polyurethane foam insulation into a single unit. The modules of an installation are interconnected by simply sweat soldering the protruding headers together at the installation site. Since the headers are a part of the manifold, the saving by eliminating the connection to the individual modules and mounting of independent headers is sizable. Reduction in the time of installation can be achieved.

In fabrication of the manifold, the cups, cross-over pipes and headers are arranged and assembled in a fixture and furnace brazed together into a unit. The placement of the headers provides for low cost, low heat loss capability of constructing the modules and the system. Once assembled as a standard length manifold section, the assembled metal manifold parts are insulated with low density cellular insulation, such as foamed polyurethane, preferably by a foam-in-place process. The foamed plastic encased manifold is further treated by application of a thin film layer of a weather and corrosion resistant material, a preferred example of which is an organopolysiloxane resin, as more fully described in U.S. Pat. No. 3,389,114, applied in a solvent vehicle as a paint, such as by dissolving the resin in n-butanol to give a solution containing about 40 percent by weight of the resin solids. The exterior coating layer protects the insulation of the manifold against ultra-violet radiation, corrosion, impact and surface damage.

Plural brackets are also fabricated onto the metal parts of the manifold, i.e. cups and headers, and the foamed-in-place plastic substantially encases the brackets to provide a low heat loss mount, by which the collector module is fastened to the roof or curtain wall at installation.

The manifold cups are assembled in a back-to-back configuration along the manifold section, and the backs of the cups formed with a central annular aperture to receive a glass tube connecting a collector on one side of the manifold with a collector coaxially located on the other side of the manifold. The cup's base aperture, upon assembly and fabrication, provides an annular flange and groove for retaining a rubber grommet in the aperture through which the delivery tube is supported and sealed thereby. Preferably, the delivery tube is glass for corrosion resistance and its non-electrolytic properties in use. The outer facing rims of the manifold cups are provided with annular ring grooves and silicone O-rings are assembled therein to provide a liquid tight seal between the glass wall of the absorber tube and the metal cup rim of the manifold.

The tube supports used to hold the outer closed ends of the collector tube assemblies are stamped galvanized metal brackets that are coated with a thin layer of the organopolysiloxane resin compound or other suitable weather resistant paint. There are spaced apart circular apertures in the brackets somewhat larger than the diameter of the cover tube. The apertures are respectively aligned with the axes of the cups (cup and aperture are coaxial) and a support spring and holder are fastened onto the bracket at each of the apertures which exert an axial compressing force on the cover tube seating it at the manifold. The tubes of the collector each extend through one of the apertures and are engaged at the closed end and held by the spring and holder. The spring and spring holders place the axial compression load onto the tube collector assembly and also locate and hold the assembly in place on the manifold. The compression loading will allow operation with a positive hydrostatic pressure inside of the absorber tube of the assembly.

Other advantages of the present invention will become apparent from a study of the following description and the accompanying drawings which are illustrative of a preferred embodiment of the invention.

In the Drawings:

FIG. 1 is a perspective view of the solar energy collector apparatus comprised of two modules installed on a support for solar exposure.

FIG. 2 is a view in perspective, partly broken away, showing one of the solar collector tubes of the apparatus.

FIG. 3 is a perspective side view of the inner parts of the manifold during fabrication showing the construction of the cups for receiving the collector tubes and the counter flow headers interconnected thereto.

FIG. 4 is a sectional plan view of the manifold parts shown on FIG. 3, taken along line 4—4 on FIG. 5.

FIG. 5 is a side elevational view of the manifold parts shown on FIG. 3.

FIG. 6 is a perspective view, with a portion broken away, showing the insulated manifold section for a modular unit of the collector apparatus.

FIG. 7 is a fragmentary sectional elevational view of the collector apparatus.

FIG. 8 is an exploded perspective view showing the interconnection of two modular sections of the manifold.

FIG. 9 is an exploded perspective view showing an end connection and cap for the manifold of the collector apparatus.

FIG. 10 is an exploded perspective view, partly in phantom outline, showing the mounting bracket for the manifold and its assembly therewith.

FIG. 11 is a fragmentary end sectional elevational view of the mounting bracket of FIG. 10.

FIG. 12 is a perspective view of the end cap mounting bracket for supporting the free ends of the array of collector tubes in the modular collector apparatus.

FIG. 13 is a perspective interior view of the end cap fastener for attaching the collector tube into the mounting bracket shown on FIG. 12.

FIG. 14 is an exploded perspective view showing the assembly of a collector tube in the mounting bracket and being retained thereon by the end cap of FIG. 13.

FIG. 15 is a schematic diagrammatic view of the invention employed in a heating or cooling system for applying the absorbed solar energy.

DESCRIPTION OF THE DRAWINGS

On FIG. 1, a plurality of tubular collectors 10, which shall be described in greater detail hereinafter, are connected into a manifold 11. The particular manifold of this invention is supported over a surface that is exposed to solar rays, such as a southerly facing side of a roof on a building, and to increase the efficiency of operation of the tubular collectors 10, the array thereof is spaced from a backside surface 12 on the roof area that comprises a diffuse-reflecting surface coextensive in area, at least, with the surface area covered by the array of the tubular collectors. The surface 12 may take the form of a white paint and may particularly be a matte finish surface, as compared to a shiny or specular finished surface. The tubular collectors 10 are supported, as a group, above the diffuse-reflecting surface layer 12 by the combination of the manifold 11 and its support bracket elements 13 fastened firmly onto surface 12 together with the end support members 14 which fasten and support the closed ends of the collectors 10 at the outwardly dependent closed ends which are opposite the ends connected into manifold 11.

The arrangement of the collectors 10, manifold 11, 13 and end support members 14 comprise a modular unit of the system which is preferably mounted over the diffuse-reflector surface 12 in accordance with the teachings of the copending application of G. R. Mather, Ser. No. 549,291 filed Feb. 12, 1975, and owned by the assignee of this application. According to that arrangement, the spacing laterally between the axial centers of the tubular collectors 10, which have a common diametrical dimension, is up to 4 times the outside diameter of the collector 10; and the collectors are supported with their axial centers in spaced relation from the surface 12 and in the direction of the sun an amount that is no greater than 4times their outer diameter.

By virtue of the system just described, the module may be firmly supported on the roof or curtain wall of a building, or the like, without provision of tracking (angular adjustment) with respect to the sun during the solar day period. However, the invention, as hereinafter described, may very readily be mounted on a support that is movable for a tracking system should such be desirable to use.

Figure 1:
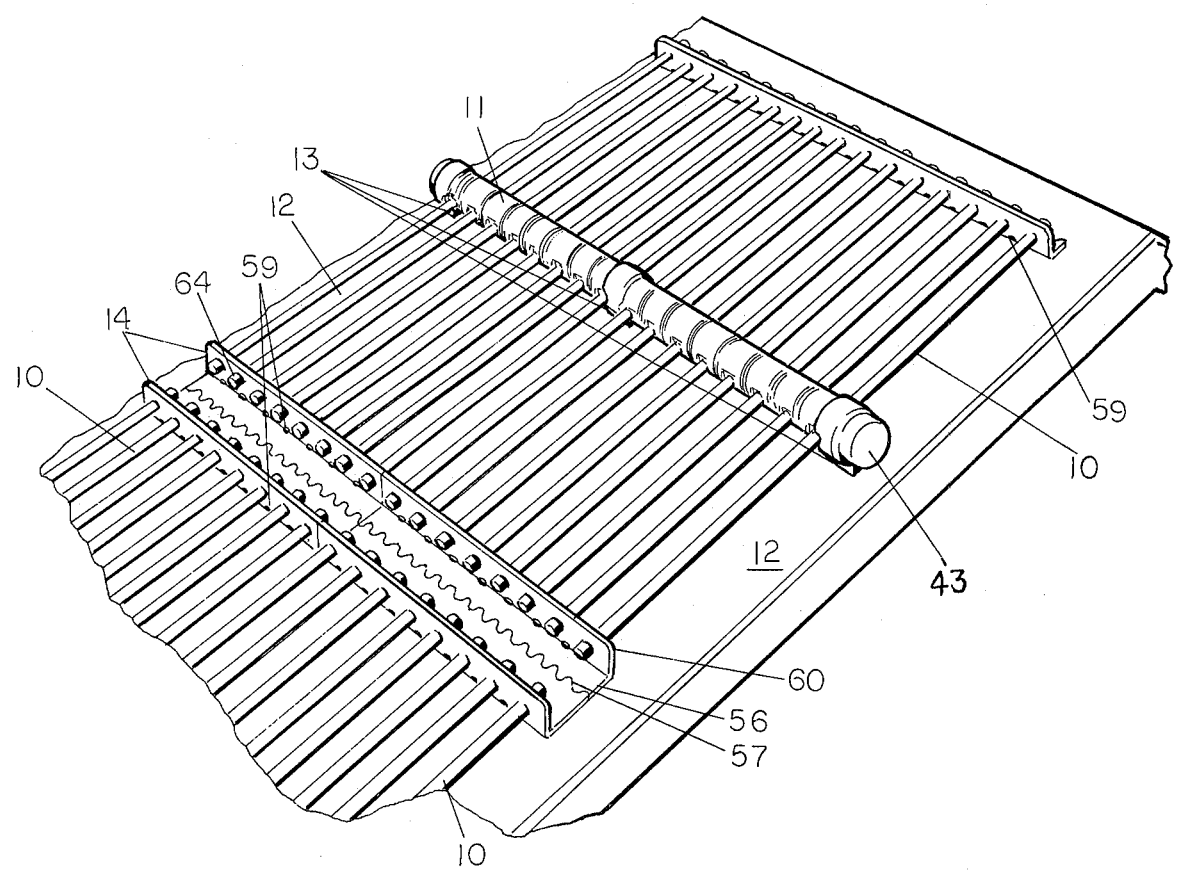

The module of the tubular collector array may be interlaced with an adjacent similar module in the installation, as is shown on FIG. 1, to provide the area of coverage and collection area desired and designed into a given installation. The module may be constructed with as many tubular collectors in use as desirable, the particular example given on FIG. 1 being a module having 32 tubular collectors 10 disposed evenly and in pairs on opposite sides of the manifold 11.

Figure 2:
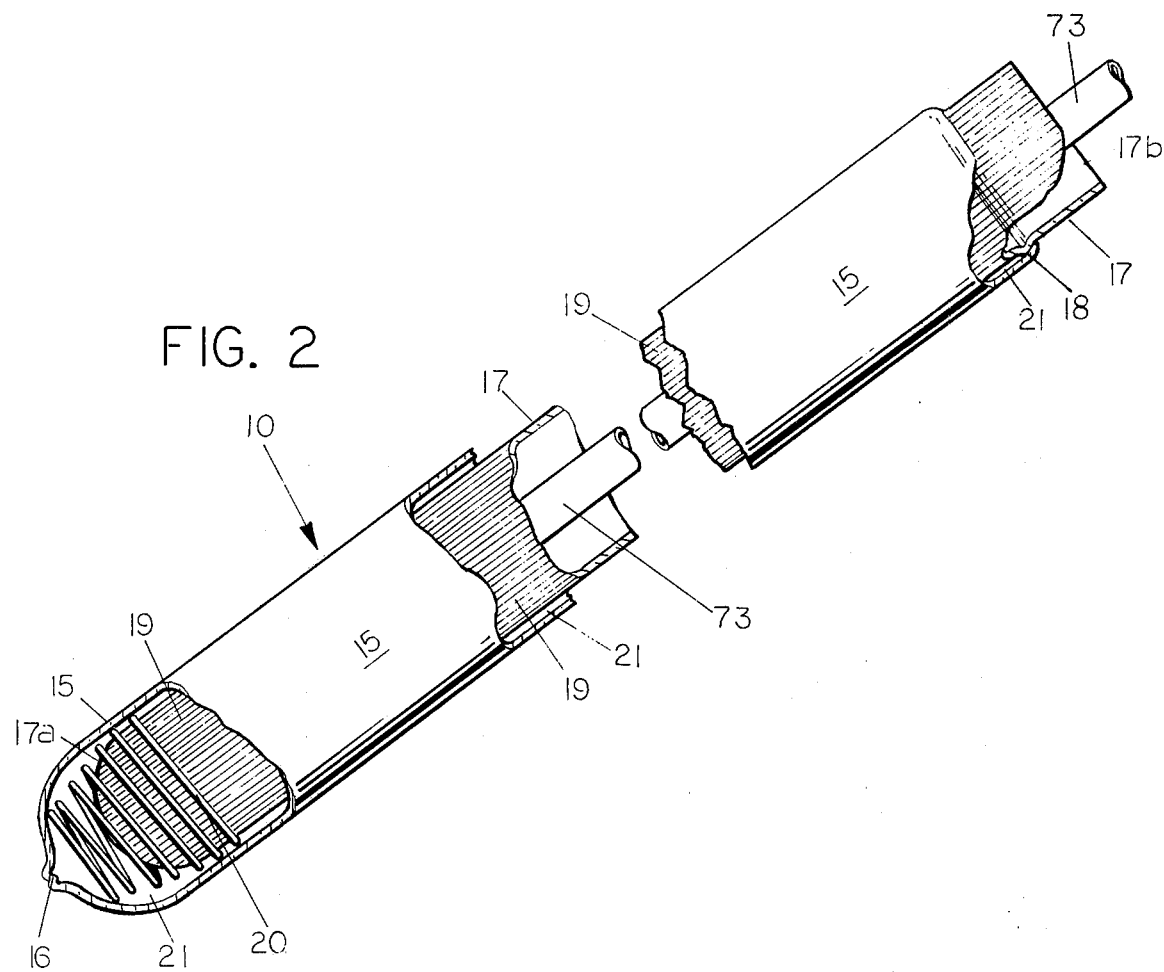

The tubular collector 10 is shown on FIG. 2 in greater detail. This collector 10 is preferably constructed of transparent glass and comprises an outer or cover tube 15 that is circumferentially transparent and open at its one end and closed at the opposite end upon tipping off the tubulation 16, as will be described later herein. The open end wall of the cover tube is sealed to a glass absorber tube 17 near one end of its tubular wall by the glass-to-glass hermetic seal 18. This seal is most readily made by fusion of the two glass parts in an annular pattern by heating the glass locally to or just above the softening point. The absorber tube 17 is made of glass and is of somewhat lesser outside diameter and of slightly greater length than the inside diameter and length, respectively, of the cover tube 15. Tube 17 is closed at its one end 17a, somewhat like a test tube, and open at its opposite end 17b. Prior to assembly, the exterior peripheral glass surface of the absorber tube 17 is coated with an opaque layer of an energy absorbing coating 19 (shown by the shaded area on FIG. 2), which is preferably an overall high performance wave length selectively absorbing coating material. Such coatings are commercially available in the optics field. A high performance wave length selective coating constitutes one which is selective in solar radiation having an absorptance property of 0.8 and higher of the wave lengths of 2.5 microns and above, and an infra-red emittance property of 0.1 and less. Thus the coating layer 19 has a very high absorptance and very low emittance. Examples of such wave length selective coatings are a metallic undercoating of aluminum or silver deposited as a layer on the glass surface; and a semi-conductor type of coating deposited over the metallic layer to provide the wave length sensitivity desired. The open end 17b of the absorber tube is inserted into the manifold, seated and sealed, in a manner to be hereinafter described. The closed, free end 17a of the absorber tube is preferably retained in place near the closed end of cover tube 15 by a coiled spring element 20. After the tubes 17, 15 are telescopically assembled and seal 18 is made, the annular space 21 between the tubes is pumped to a hard vacuum, on the order of $10^{-4}$ torr or less. The assembly 17, 18, 15, 20 is baked at high temperature for removal of moisture. The tubulation 16 at the end of the cover tube 15 is tipped off (sealed) in the known manner, so as to form a vacuum tight seal.

MANIFOLD FABRICATION

Figure 6:
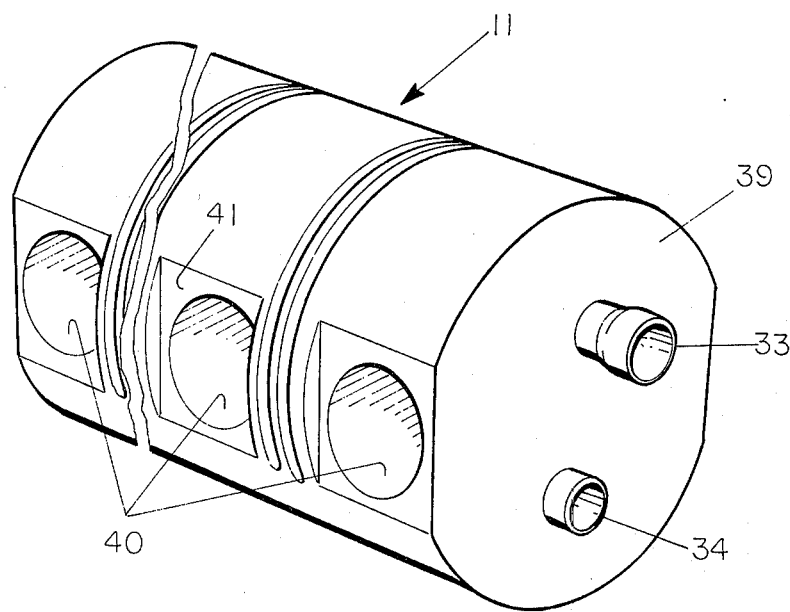
Figure 3:
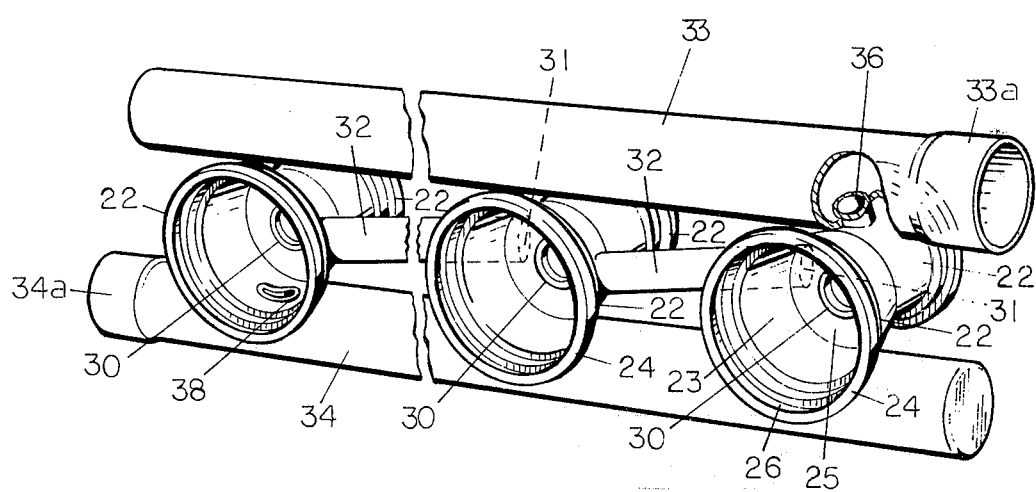
Figure 4:
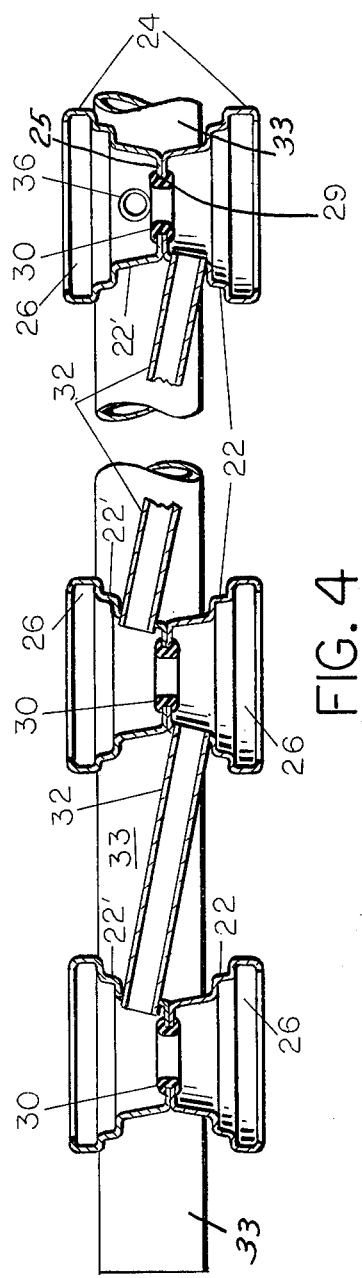
Figure 7:
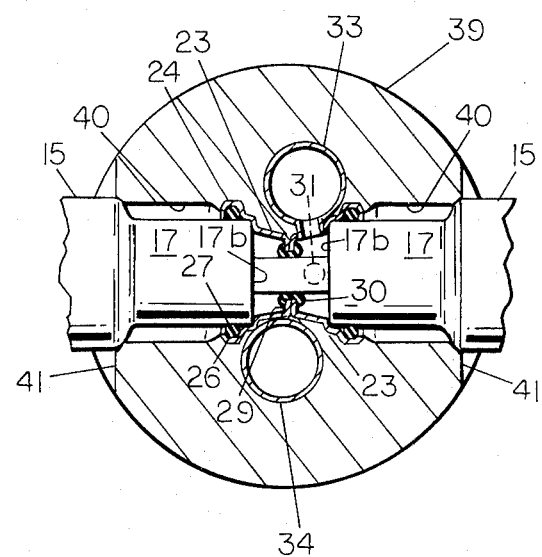

The manifold 11 is shown in detail on FIGS. 3–11. Referring first to FIGS. 3–5 and 7, a series of cups 22 are made as metal stampings, such as copper selected for its corrosion resistance. Cups 22 have an annular, outwardly flared and stepped wall 23 which provides a flange 24 at the outer open end thereof and an end wall 25 across the opposite closed end. Interiorly of flange 24 is an annular groove 26, which provides a gasket seat for a silicone rubber O-ring gasket 27 (FIGS. 4 and 7).

As seen on FIG. 4, cups 22 are arranged in oppositely facing pairs, indicated 22 and 22', such that the interior closed end walls 25 of each are in abutting relationship. An aperture 28 (FIG. 5) is punched in each closed portion of the end wall 25 and a metal portion of one end wall portion is folded or bent over the periphery of the aperture 28 in the other abutting portion of the end wall 25 and crimped. The pair of cups 22, 22', in each instance, together define a rim 29 encircling aperture 28 which receives a later assembled circular grommet 30, preferably comprised of silicone rubber. Along wall 23 of the cups, a circular port 31 is cut in each stamping to receive the ends of a copper tube 32, which serves as a liquid cross connection between a cup 22 and another cup 22'. The cups 22, 22' and cross connecting tubes 32 are placed in a longitudinal alignment, as shown on FIGS. 4 and 5, ready for fastening them in an assembly.

Along the sides of the assembly of cups 22, 22', as best seen in FIGS. 3 and 4, there are provided two copper header tubes, the one being used as inlet header tube 33, positioned along one side of the cups and disposed between the opposite facing flanges 24 thereof, and the other tube being used as outlet header tube 34 and similarly positioned along the other side of the cups. The headers 33, 34 extend in parallel, generally, with the longitudinal dimension of the manifold assembly which coincides with the cross-over tubes 32. Inlet header 33 has a stub pipe 36 (FIGS. 3 and 5) connecting it with the interior of the one end cup 22 of the manifold series, the pipe 36 being fastened into another port formed in the wall 23 of the end cup 22 at about 90° from the cross-over pipe connection point. This connection via pipe 36 will introduce fluid into the first cup pair of the series in the manifold section. Fluid is removed from the manifold through a port in the wall 23 of the last cup 22 of the series, which is connected by stub pipe 38 into the outlet header tube 34.

Figure 5:
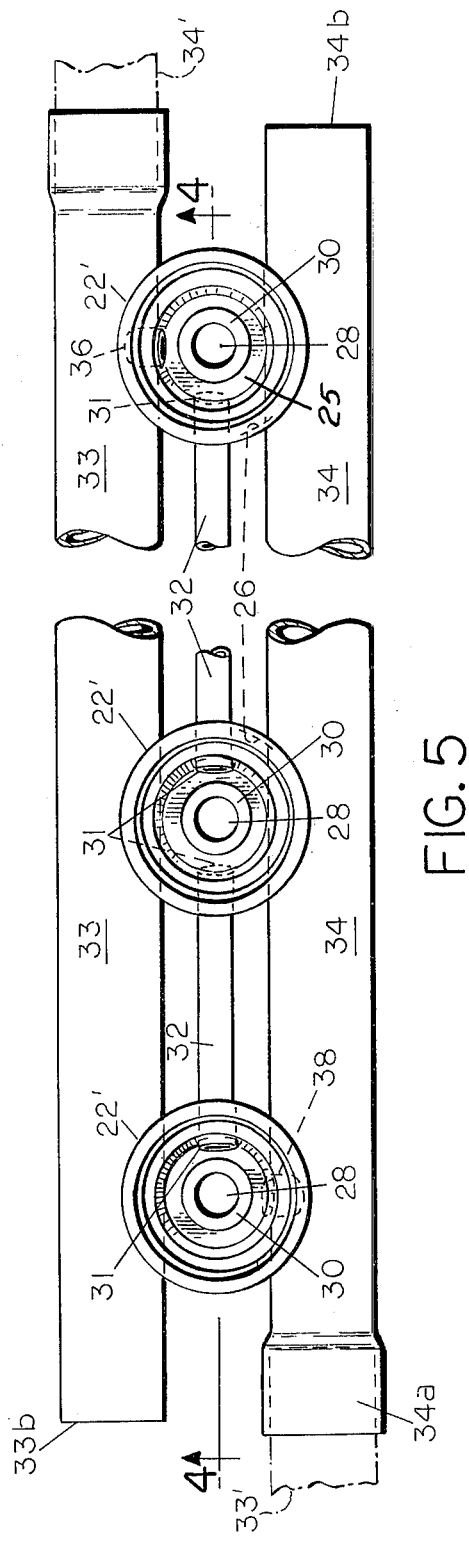

The header tubes may be arranged, as shown on FIG. 5, so that the manifold sections may be connected one to another in series. The inlet header 33, for example, will be sweat solder connected with an outlet header 34' (in phantom outline on FIG. 5) from a preceding manifold section at the flanged end 33a, the opposite end 33b being closed. The outlet pipe 34 is reversed in that the flanged end 34a is disposed opposite the closed end 33b of the inlet header, and a closed end 34b is opposite flanged end 33a. Outlet header 34 will in turn receive at its flanged end 34a the end of the next inlet header pipe 33' (FIG. 5) and the two sweat soldered together. The inter-modular connections, just described, will be made at the job site in erecting the particular modular configuration called for by the installation of the system.

The parts are assembled as above described in a fixture and furnace brazed together into a unit in a known manner. After the parts are assembled and brazed together for a manifold section, the unit is placed into a mold for defining an insulation jacket, shown in particular on FIGS. 6–9. The jacket 39 is molded, preferably by a foam-in-place process, whereupon the assembled metal manifold parts, just described, are insulated with a low density cellular insulation, such as foamed polyurethane. The polyurethane material is preferred for its excellent insulation properties and its hard skin covering. The mold (not shown) provides the exterior contours of the insulation jacket 39 shown on the drawings and particulate polyurethane and foaming agent are added to fill the mold. As is shown on FIG. 6, the foamed plastic insulation jacket 39 is shaped generally as a cylinder, the inlet header tube 33 or both inlet and outlet header tubes 33 and 34 (as on FIG. 6) protruding from the longitudinal end of the manifold section 11. The mold in which the insulation jacket 39 is formed includes plugs and cores to form the apertures 40 for inserting the open end of the tubular collectors therein and in sealing connection with the O-ring gasket 27 held by the annular groove 26 provided at flange 24 of the cups 22 (FIG. 7). The insulation is molded with a flat face 41 for butting the end of the cover tube thereon in seating the collector into the socket-like connection, i.e. gasket 27 in the flange end of cup 22.

The final molded insulation jacket is next coated with a thin layer of corrosion resistant material, sealing the exposed outer cells or pores of the insulation. This sealant may take the form of a white paint material, and an example of a preferred sealant material is a brushed or sprayed on layer of an organopolysiloxane resin dissolved in n-butanol solvent, the mixture of resin and solvent containing about 40 percent by weight of resin solids. The applied layer is dried and cured to provide a protective coating over the outer hard skin of the insulation exhibiting good wear resistance.

There are shown on the drawings the two different configurations of manifold sections needed for connecting the modules in series in an elongated bank thereof; these being the end sections of manifold for placement at either end of the system, and the intermediate sections joined together therebetween.

The end section of manifold is shown on FIG. 9, which indicates an initial inlet connection of the system working fluid which is connected at the elbow 42 sweat soldered onto inlet header 33. The inlet supply pipe of the heating/cooling system is connected at the elbow 42. After the connection is made, the exposed piping is covered by the end cap 43 which fits over the end of the insulation jacket 39 and the arcuate recess 44 on either side of cap 43 fits around the cover tube of a tubular collector 10 installed in the end aperture 40 nearest the cap.

Figure 8:
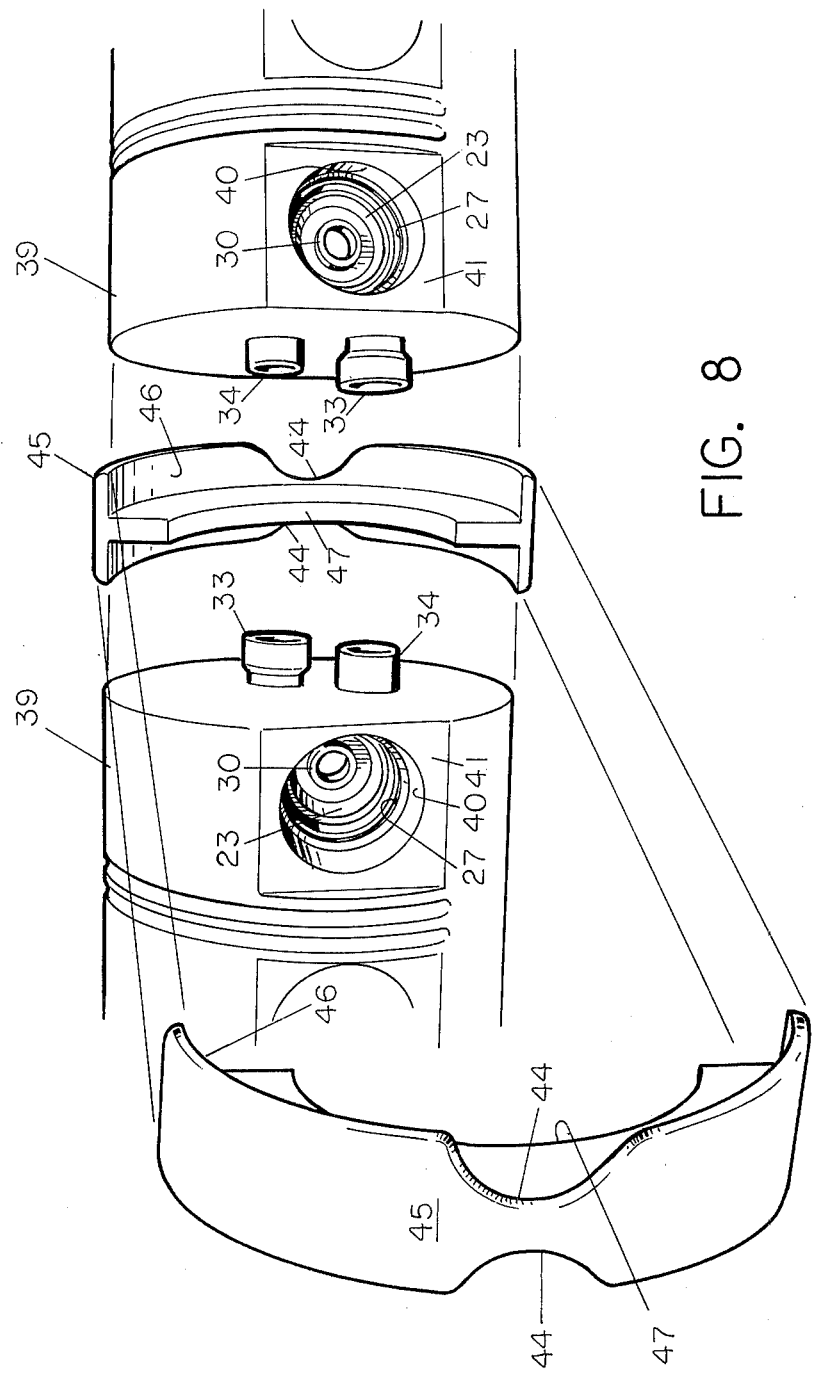

An intermediate section of manifold is shown on FIGS. 6 and 8. In this instance, the foamed thermoplastic insulation jacket 39 is formed the same way, and the two header pipes 33 and 34 protrude from each axial end of the section. The intermediate sections are placed 180° from each other such than an inlet header tube 33 of the next section is connected to the outlet header tube 34 of the previous section, reference being left to right on FIG. 8. Similarly, the outlet header tube 34 is connected to an inlet header tube 33 of the previous section. The pipes and flanges are interfitted and sweat soldered together to make a fluid tight coupling of the sections. Next, a split coupling collar 45 is assembled over the adjacent ends of the two connected manifold sections and fastened in place. The split collar 45 has a semi-circular, annular web 46 that includes two arcuate recesses 44 formed opposite the tubular collectors to be inserted into the apertures 40 at the adjacent end positions on the manifold. The split sections of collar 45 have a radial, arcuate center rib 47 for engaging the end faces of the insulation jacket 39 of the two coupled together sections of manifold. In essence, the split coupling collar 45 of the insulation material is like a special split washer. The collar halves 45 are assembled together in full arcuate array encircling the adjacent ends of the manifold jacket sections and fastened together in place by suitable means, such as an adhesive or by tape.

At the last section of manifold selected in the system design, an end section similar to FIG. 9 is used but shifted 180° so as to provide the outlet pipe connection for the fluid into the heating/cooling system.

One means of mounting the manifold sections on the installation's supporting structure is by the support bracket elements 13 shown on FIGS. 1, 10 and 11, with occasional references also to FIG. 9. An angle bracket 48 is cast in a lower support segment 49 formed integrally with the end section of the insulation jacket 39, shown on FIG. 9. This bracket 48 is placed beside a corresponding L-shaped lower bracket 50 and fastened thereto securely by studs 51. Prior to this, the lower bracket 50 may be fastened in place on the surface 12 of the roof structure over a rubber gasket 53, screws 54 and lock washers 55.

The support elements 13 space the sections of the manifold 11 above the surface 12 to fulfill the purposes of: (1) supporting the manifold and in turn the tubular collectors 10 at their one end a prescribed distance above the diffuse-reflector surface 12 for optimum operation, and (2) the manifold itself is raised above the roof surface to allow water, ice and snow to drain on the roof surface, if such be the place of the installation. Also, in this latter connection, wind is allowed to travel around the manifold, which is designed in the contour of the manifold (cylindrical shown herein) for best air flow and least wind resistance.

Figure 12:
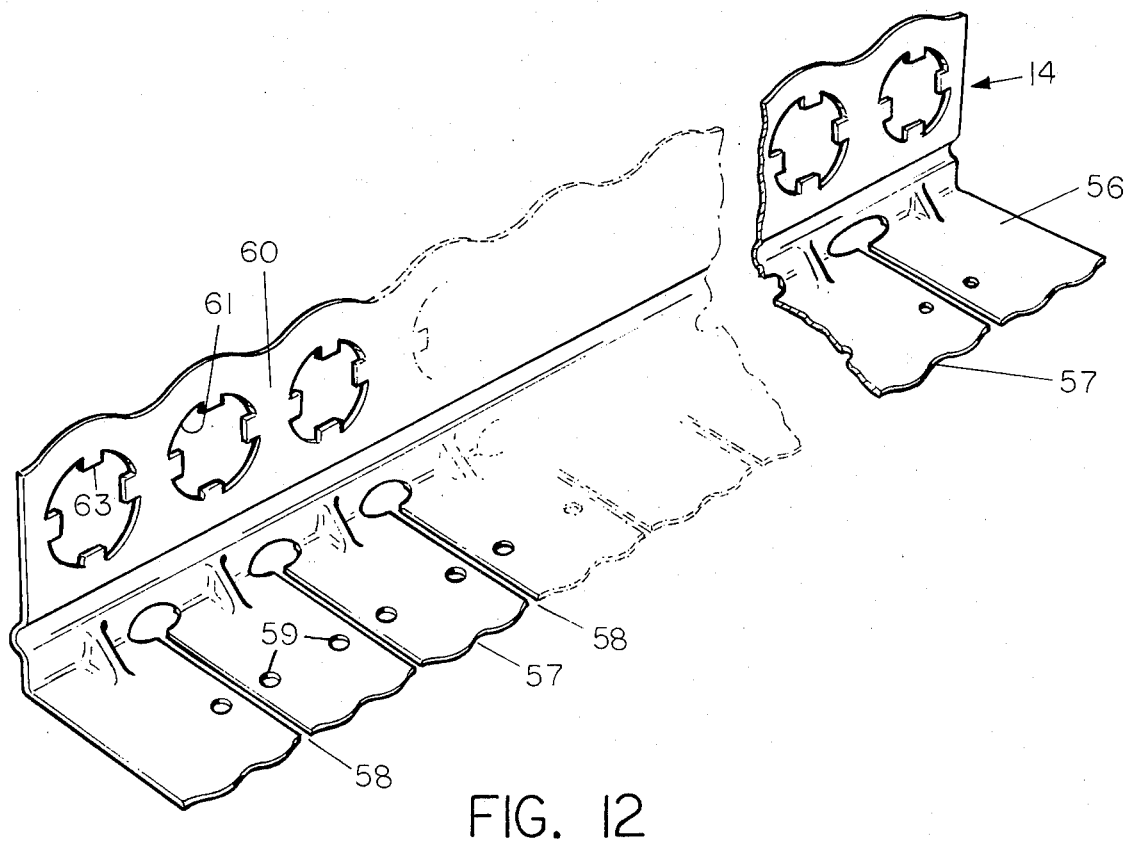

Having described manifold 11 and its relationship to the tubular collectors 10 in end supporting them at their one end 17b, the other closed end 17a is supported in the members 14 secured to the surface 12 and extending parallel with the longitudinal axis of manifold 11. The detail of the tube end support member 14 is shown on FIGS. 12–14. The member 14 is formed of metal and stamped to an L-shaped configuration. The lower or base leg 56 of the member is provided along the free edge surface with an outer scalloped edge 57 sinusoidally contoured (as a sine wave) enabling flush end-to-end assembly of two modules of the collector, as shown on FIG. 1. The leg 56 also includes slots 58 in the metal which terminate in drain holes 59 which serve as a means for draining water, etc. along a roof where the solar collectors are installed. The up-standing leg 60 of member 14 is formed with contoured apertures 61 spaced therealong to correspond with the spacing of the tubular collectors 10 along the manifold. The centers of the respective apertures should align with the axis of the cups 22 in the manifold. On the periphery of apertures 61 are plural lugs 63. A frusto-conical end cap 62, formed of plastic, is placed over the tubulation 16 at closed end 17a of a collector tube 10 that is inserted through aperture 61.

Prior to assembling the tubular collector on the end bracket 14, the longitudinal feeder tube 73 (FIG. 2) is inserted through the rubber grommet 30 retained in the aperture in the end wall 25 of the manifold cups. Feeder tube 73 is preferably made of glass and extends through grommet 30 so that one end of tube 73 is near the closed end 17a of the absorber tube 17 of the tubular collector on the right hand side of the manifold and the other end of this tube 73 will extend to near the closed end 17a of the absorber tube in the collector that is assembled on the left hand side of the manifold (FIG. 7). Thus, the feeder tube will be in position in the manifold grommet opening before the tubular collector elements comprised of tubes 15 and 17 are placed into the manifold seat at the O-ring gasket 17 thereof. Of course, the depending feeder tube ends are inserted inside the absorber tube at this time in assembly. Thereafter, the closed end of the collector is placed through the aperture 61 in the end support structure 14.

Next, an end retainer member 64 is fitted with the coil spring 65 and the inner end thereof fits over the annular end boss 66 on cap 62. The opposite end of spring 65 is compressed against the inner surface of end wall 67 of the retainer 64. A vent 68 is provided in wall 67 for the draining of rain water. With the closed end 17a of the collector tube carrying end cap 62, spring 65 and retainer member 64, the retainer housing is pushed axially toward the aperture compressing spring 65. The glass engages the plural, spaced apart axially disposed interior webs or ribs 72 of the end cap 62. Lugs 63 are aligned with the notches 69 in the rear flange 70 of the retaining member and the notches correspond in spacing annularly with lugs 63 about the inside periphery of aperture 61. By axial pressure on assembly, lugs 63 clear through notches 69, whereupon the retainer is twisted clockwise (FIG. 14) and released. The flange 70 and lugs 63 cooperate as a bayonet-type fastener for connecting the retainer member to the end support bracket through the aperture 61. Twisting movement in that direction is restrained when the lugs 63 butt against the longitudinal wall 71 spaced about the periphery of the retainer 64. When the pressure is released, after twisting, the compression force of spring 65 drives the retainer assembly forward and locks the flanges 70 against the lugs 63. This is a form of a bayonet, twist lock. Thereafter, the outer glass tube of the tubular collector 10 rests solely in the plastic end cap 62 avoiding scratching of the glass surface and the tubular collector 10 is axially loaded and seated on its O-ring gasket 27 in the mouth of the cup 22 of the manifold, the position shown on FIG. 7.

The end force applied by the collectors 10 may be established for low pressure operation. At pressures internally exceeding 10 psig, the collector tubes 10 will be lifted from the O-ring seat with the internal pressure acting on the absorber tube cross sectional area at the closed end 17a biased only by the axial spring load in the end cap assembly. Thus, glass failure will be avoided by leakage or bleed off of the working fluid which will relieve excess pressure build up to protect the glass parts.

FIG. 15 illustrates a system in diagrammatic form which may utilize the present invention. The heated fluid flows from the outlet header pipe 34 into a heat storage sump 74 that is vented at 75 through a relief valve 76. The hot fluid is connected by a pipe 77 to the inlet of a low pressure pump 78 which maintains circulation of the fluid through a heat exchanger 79 that is connected to a load (e.g. for heating or cooling). Fluid transferred through the heat exchanger device 79 is connected to the inlet header pipe 33 to complete the circuit. The closed circuit is maintained at the relatively low pressure selected for the system.

It should be understood that several other systems could be connected into the solar energy collector device of the invention, the foregoing installation, illustrated schematically on FIG. 15, is given merely by way of an operating example.

Other and further modifications may be resorted to without departing from the spirit and scope of the appended claims.

What is claimed is:

1. A solar energy collector module comprising
  a plurality of tubular collector elements having the same outside diameter and each including a circumferentially transparent outer tube having a closed end and an open end, and, interiorly of said outer tube, a hollow elongated absorber tube spaced from said outer tube, having a closed end and an open end and including a solar energy absorbing surface disposed between its ends, means annularly sealing the outer tube and the absorber tube together adjacent the open end of one of said tubes to provide a closed space between the two, said space being evacuated to sub-atmospheric pressure, the absorber tube having an interior chamber,
  an elongated manifold having lateral, outwardly facing cups for receiving the open ends of said tubular collector elements, each said cup comprising an annular flange at its outer open end, an O-ring gasket, and annular retaining means in said flange for holding said gasket, the gasket forming a fluid seal in the cup encircling said collector elements,
  a supply of working fluid,
  an inlet header pipe connected to said fluid supply and to at least one of said cups, means interconnecting the cups for flow of fluid through the absorber tubes and between the cups,
  an outlet header pipe connected to at least one of said cups for receiving fluid therefrom, and an insulation jacket member of low density cellular material surrounding all of said cups, the interconnecting means therefor and said inlet and outlet header pipes, said jacket including apertures coaxial with said cups for connecting the tubular collector elements into said cups of the manifold, and means supporting the tubular collector elements sealingly in said cups of the manifold.

2. The solar energy collector module of claim 1 wherein the insulation jacket member comprises a foamed polyurethane.

3. The solar energy collector module of claim 2 wherein the exposed surfaces of the foamed polyurethane jacket member are coated with a layer of organopolysiloxane resin.

4. The solar energy collector module of claim 1 wherein the manifold includes plural support bracket elements longitudinally spaced therealong and imbedded in the insulation jacket member thereof, said elements including means adapted for fastening the manifold in a raised, spaced relationship onto a supporting surface.

5. The solar energy collector module of claim 1 wherein said inlet header pipe is disposed longitudinally the length of said insulation jacket of the manifold and extends beyond each of the opposite ends thereof in spaced relation to the inlet header pipe.

6. The solar energy collector module of claim 1 wherein the means supporting the tubular collector elements comprise an elongated end support means disposed along the longitudinal extent of the elongated manifold and spaced laterally thereof a distance less than the outwardly depending extent of the tubular collector elements supported at their one open end by said manifold, plural apertures spaced along said end support means for loosely encircling the outer closed ends of each of the depending tubular collector elements, a frusto-conical end cap element telescopically inserted over the closed end of each of the tubular collector elements and engaging the outer surface of said collector element, a hollow annular cup-shaped end retainer member encircling each of the end cap elements and said collector elements, a coil spring axially compressed between each end cap element and retainer member, and means detachably coupling each retainer member on said end support means around the aperture thereof for holding the spring in compression, thereby axially spring loading each of the tubular collector elements in sealing engagement in their respective cups of the manifold.

7. The solar energy collector module of claim 6 wherein the frusto-conical end cap elements are comprised of a thermoplastic material and include plural axially disposed ribs along inner wall surface thereof, the ribs engaging the outer surface of the tubular collector elements at peripherally spaced locations thereof.

8. The solar energy collector module of claim 6 wherein the means detachably coupling said retainer member on the said end support means each comprise plural radial, inwardly facing lugs about the perimeter of said aperture and an interrupted annular flange about the exterior of said retainer member, said flange and lugs interacting in assembly by rotation of one relative to the other to provide a bayonet-type fastener connecting the retainer member to the end support means through the aperture.

9. The solar energy collector module of claim 6, wherein the elongated end support means comprise an L-shaped metal bracket member, the upstanding leg of said bracket member being apertured along its longitudinal dimension, there being slot-like openings formed at spaced intervals along said longitudinal dimension in the base and at the root intersection of the legs of the L-shaped member adapted for drainage flow of fluid along a support surface for the module.

10. The solar energy collector module of claim 9, in which the base leg of the L-shaped member includes a sinusoidally contoured free edge adapted for interfitting abutment of said member with a similar member of an adjacent module.

11. A manifold apparatus for a solar energy collector comprising plural pairs of coaxial metal cup members having opposite end openings each defined by an annular flange, an annular wall therebetween defining a chamber, and a transverse wall intermediate the flanges separating the chamber into two side-by-side compartments, the pairs of said cup members being disposed in spaced relationship longitudinally of the manifold and the axes of the cup members are aligned longitudinally on opposite sides of the manifold, an inlet header pipe extending longitudinally of the manifold, a fluid handling conduit connecting the inlet header pipe and at least one of said compartments of the cup members, an outlet header pipe extending longitudinally of the manifold and spaced from the inlet header pipe, a fluid handling conduit connecting at least one other of said compartments of the cup members and the outlet header pipe, means interconnecting the compartments of the cup members for flow of fluid therebetween, and an insulating jacket member comprised of a cellular insulating material surrounding the cup members, inlet and outlet header pipes and fluid handling conduits, the jacket member including apertures corresponding with the flanged end openings of said cup members providing access to the cup members for connecting solar collector apparatus externally of the jacket member to the cup members.

12. The manifold apparatus of claim 11, wherein the outlet header pipe and inlet header pipe each extend beyond the opposite longitudinal ends of the insulating jacket member.

13. The manifold apparatus of claim 12, characterized by plural manifold sections interconnected end-to-end at the outlet header pipes and inlet header pipes respectively for flow of fluid throughout said plural sections.

14. The manifold apparatus of claim 13, wherein the plural manifold sections are of substantially cylindrical configuration of substantially the same diameter.

15. The manifold apparatus of claim 14, wherein the end-to-end assembled manifold sections are longitudinally spaced apart, and in which is included a split cylindrical collar member encircling the interconnected inlet header and outlet header pipes in the space between each of the adjacent manifold sections of the interconnected plurality thereof, the said collar member being comprised of a cellular insulating material and in abutting end engagement with the ends of the insulating jacket component of said manifold sections.

16. The manifold apparatus of claim 15, wherein the opposite endmost manifold sections of the plural section manifold includes a cylindrical end cap each comprised of cellular insulating material enclosing the outwardly extending portion of the outlet and inlet header pipes thereat.

17. The manifold apparatus of claim 16, wherein the cellular insulating material of the cylindrical insulating jacket members, each split cylindrical collar member and opposite cylindrical end caps are comprised of a foamed polyurethane material.

18. The manifold apparatus of claim 11, wherein plural mounting brackets are fastened to the insulating jacket member of each of said manifold sections and depend therefrom normal to the axes of the cup members of the manifold sufficiently for spacing the insulating jacket member thereof from a supporting surface.

19. In a solar energy collector apparatus, the combination of
a support surface for said apparatus exposed to sunlight,
a manifold means fastened to said support,
a tubular solar collector comprised of a double walled glass tubular collector member that is open at one axial end and in operating engagement thereat with the manifold spaced above said support surface and closed at its opposite axial end, and
end support means engaging the tubular collector member adjacent its other closed end supporting the tubular collector member in a spaced relationship above said support surface, said end support means comprising
a bracket fastened to said support surface and having an upstanding leg,
an aperture in said upstanding leg adapted to receive the tubular collector therethrough,
an annular end cap telescopically inserted over the end of the collector and engaging the latter on the side of the bracket remote from the manifold,
a cup-shaped annular retainer member having one axial end open inserted over the end cap and encircling the closed end of the tubular collector opposite the manifold side of the bracket, the retainer member being rotatable manually about the end of the collector member,
lug means on the upstanding leg of said bracket adjacent the aperture,
an annular, interrupted flange about said retainer member adjacent its open end adapted for insertion through the aperture, said interruptions in said flange being registered with the lug means thereby enabling the flange to be inserted through the aperture but otherwise preventing movement of the flange through said aperture, and
axial spring means compressed between the other opposite axial end of the cup-shaped retainer member and the adjacent end of the end cap upon inserting said flange of the retainer member through the aperture, thereby axially loading the tubular solar collector onto the manifold and supporting the closed end thereof in predetermined spacing from said support surface in the direction of the sun, the retainer member, upon rotation out of registry with said lugs on the bracket, holding the retainer member of the bracket by engagement of said flange with said lugs.

20. The solar energy collector apparatus of claim 19 wherein said bracket is L-shaped and includes a base leg integrally joined with the upstanding leg, the base leg being fastened to said support surface, the bracket including slot means for drainage of water flow on said support surface.

21. The solar energy collector apparatus of claim 19 wherein said bracket is L-shaped and includes a base leg integrally joined with the upstanding leg, the outer edge of the base leg being contoured as a sinusoidal edge configuration.

22. The solar energy collector apparatus of claim 19 wherein said annular end cap is frusto-conical having plural axial extending ribs along the interior annular surface thereof, said ribs engaging the outer glass surface of the tubular solar collector, and is comprised of a plastic material.

* * * * *